(12) United States Patent
Bhattacharjee et al.

(10) Patent No.: US 10,067,958 B2
(45) Date of Patent: *Sep. 4, 2018

(54) SUPPORTING TRANSIENT SNAPSHOT WITH COORDINATED/UNCOORDINATED COMMIT PROTOCOL

(71) Applicant: INTERNATIONAL BUSINESS MACHINES CORPORATION, Armonk, NY (US)

(72) Inventors: Bishwaranjan Bhattacharjee, Yorktown Heights, NY (US); Mustafa Canim, Ossining, NY (US); Mohammad S. Hamedani, Chappaqua, NY (US); Kenneth A. Ross, New York, NY (US); Adam J. Storm, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 491 days.

This patent is subject to a terminal disclaimer.

(21) Appl. No.: 14/748,438

(22) Filed: Jun. 24, 2015

(65) Prior Publication Data

US 2016/0103829 A1  Apr. 14, 2016

Related U.S. Application Data

(63) Continuation of application No. 14/509,683, filed on Oct. 8, 2014.

(51) Int. Cl.
*G06F 17/30* (2006.01)

(52) U.S. Cl.
CPC .. *G06F 17/30309* (2013.01); *G06F 17/30368* (2013.01); *G06F 17/30377* (2013.01);
(Continued)

(58) Field of Classification Search
CPC ......... G06F 17/30315; G06F 17/30309; G06F 17/30371; G06F 17/30312;
(Continued)

(56) References Cited

U.S. PATENT DOCUMENTS 5,287,496 A   2/1994  Chen et al.
8,521,695 B2  8/2013  Zwilling et al.
(Continued)

OTHER PUBLICATIONS

Cahill, M., et al. "Serializable Isolation for Snapshot Databases" ACM Transactions on Database Systems. vol. 34, No. 4, Dec. 2009. pp. 729-738.

(Continued)

*Primary Examiner* — Dangelino N Gortayo
(74) *Attorney, Agent, or Firm* — Tutunjian & Bitetto, P.C.; Rahan Uddin

(57) ABSTRACT

Methods and a system are provided. A method includes maintaining an in-page log for records in each of a plurality of data pages of a multi-version database. The method further includes adding record update information to the in-page log when a corresponding one of the records is deleted or updated. The method also includes consulting the in-page log for a recently updated one of the records or a recently deleted one of the records to determine a record status thereof. The method additionally includes spilling, by a processor-based overflow manager, to overflow pages when the in-page log is full. The data pages include any of row-oriented data pages and column-oriented data pages.

14 Claims, 9 Drawing Sheets

(52) U.S. Cl.
CPC .. *G06F 17/30315* (2013.01); *G06F 17/30353* (2013.01); *G06F 17/30356* (2013.01); *G06F 17/30371* (2013.01); *G06F 17/30592* (2013.01); *G06F 2201/84* (2013.01)

(58) Field of Classification Search
CPC ......... G06F 17/30339; G06F 17/30368; G06F 11/1471; G06F 17/30356
USPC ........ 707/607, 639, 626, 648, 649, 695, 752
See application file for complete search history.

(56) References Cited

U.S. PATENT DOCUMENTS

| | | | | |
|---|---|---|---|---|
| 8,671,076 | B2* | 3/2014 | Price | G06F 17/30371 707/649 |
| 9,390,147 | B2* | 7/2016 | Bird | G06F 17/30551 |
| 9,519,664 | B1* | 12/2016 | Kharatishvili | G06F 17/30321 |
| 9,652,487 | B1* | 5/2017 | Patiejunas | G06F 17/30371 |
| 9,881,071 | B2* | 1/2018 | Slavicek | G06F 17/30575 |
| 2014/0040199 | A1 | 2/2014 | Golab et al. | |
| 2015/0172120 | A1* | 6/2015 | Dwarampudi | G06F 3/06 709/221 |

OTHER PUBLICATIONS

Bernstein, P., et al. "Concurrency Control and Recovery in Database Systems" Addison-Wesley 1987. Chapter 5. pp. 143-166.
Larson, P., et al. "High-Performance Concurrency Control Mechanisms for Main-Memory Databases" Proceedings of the VLDB Endowment, vol. 5. No. 4. Aug. 2012.
Mohan, C., et al. "ARIES: A Transaction Recovery Method Supporting Fine-Granularity Locking and Partial Rollbacks Using Write-Ahead Logging" ACM Transactions on Database Systems, vol. 17, No. 1, Mar. 1992, pp. 94-162.
List of IBM Patents or Patent Applications Treated as Related.

* cited by examiner

SUPPORTING TRANSIENT SNAPSHOT WITH COORDINATED/UNCOORDINATED COMMIT PROTOCOL

CROSS-REFERENCE TO RELATED APPLICATIONS

This application is a Continuation application of co-pending U.S. patent application Ser. No. 14/509,683, filed Oct. 8, 2014, which is incorporated herein by reference in its entirety.

BACKGROUND

Technical Field

The present invention relates generally to information processing and, in particular, to supporting a transient snapshot with coordinated/uncoordinated commit protocol.

Description of the Related Art

There is a paradigm shift in On-Line Transaction Processing (OLTP) from perspective of both hardware and software. The hardware trends are a cheaper and larger main-memory and larger number of cores per processor. These trends are paving the way for OLTP databases to become entirely memory-resident (substantially faster latency) and to potentially support more concurrent environment (substantially faster throughput). The software trend is the rise of multi-version databases that avoids in-place updates of records and retains the history of data (the old and new versions of the modified record).

Some implications of multi-version databases are that records will have many versions, and that updates will become inserts of new records. Thus, mechanisms are needed to cope with the faster growth rate of the database, to invalidate older versions without in-place update, and to associate the many versions of the record.

SUMMARY

According to an aspect of the present principles, a method is provided. The method includes maintaining an in-page log for records in each of a plurality of data pages of a multi-version database. The method further includes adding record update information to the in-page log when a corresponding one of the records is deleted or updated. The method also includes consulting the in-page log for a recently updated one of the records or a recently deleted one of the records to determine a record status thereof. The method additionally includes spilling, by a processor-based overflow manager, to overflow pages when the in-page log is full. The data pages include any of row-oriented data pages and column-oriented data pages.

According to another aspect of the present principles, a method is provided. The method includes maintaining an in-page log for records in each of a plurality of data pages of a database. The method further includes adding record update information to the in-page log when a corresponding one of the records is deleted or updated. The method also includes consulting the in-page log for a recently updated one of the records or a recently deleted one of the records to determine a record status thereof. The method additionally includes splitting, by a processor-based overflow manager, a given data page of data into a first page and a second page with at least a portion of the data and at least a portion of the in-page log on the first page and a remainder of the data and a remainder of the in-page log on the second page when the in-page log on the given data page is full. The data pages include any of row-oriented data pages and column-oriented data pages.

According to yet another aspect of the present principles, a system is provided. The system includes a processor-based in-page log manager for maintaining an in-page log for records in each of a plurality of data pages of a multi-version database, adding record update information to the in-page log when a corresponding one of the records is deleted or updated, and consulting the in-page log for a recently updated one of the records or a recently deleted one of the records to determine a record status thereof. The system further includes a processor-based overflow manager for spilling to overflow pages when the in-page log is full or splitting a given data page of data into a first page and a second page with at least a portion of the data and at least a portion of the in-page log on the first page and a remainder of the data and a remainder of the in-page log on the second page when the in-page log on the given data page is full. The data pages include any of row-oriented data pages and column-oriented data pages.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to supporting a transient snapshot with coordinated/uncoordinated commit protocol.

In an embodiment, the present principles provide a transient snapshot read technique from either or both of the index and the base table to reduce the cost of re-constructing a snapshot of a database as of the time a query was issued using an efficient in-page tracking of recent changes of data that can be garbage collected as soon as they are not relevant to any active queries in the system. Within each data/index page, for every change, we record within the page (changed record identifier, endtime/xid), where the changed record identifier could be a key, a row identifier (RID), a logical identifier (LID), or the offset of the changed record, and xid is the transaction id that changed the record and the updated values. The in-page log information could be discarded/garbage collected responsive to such information falling out of the window of the oldest active query in the system (when no longer needed for any active queries in the system and no support for time travel is needed).

Thus, the proposed transient snapshot is advantageously supported through both indexes and base tables. The proposed snapshot technique is also advantageously applicable to both column and row-oriented databases.

Figure 1:
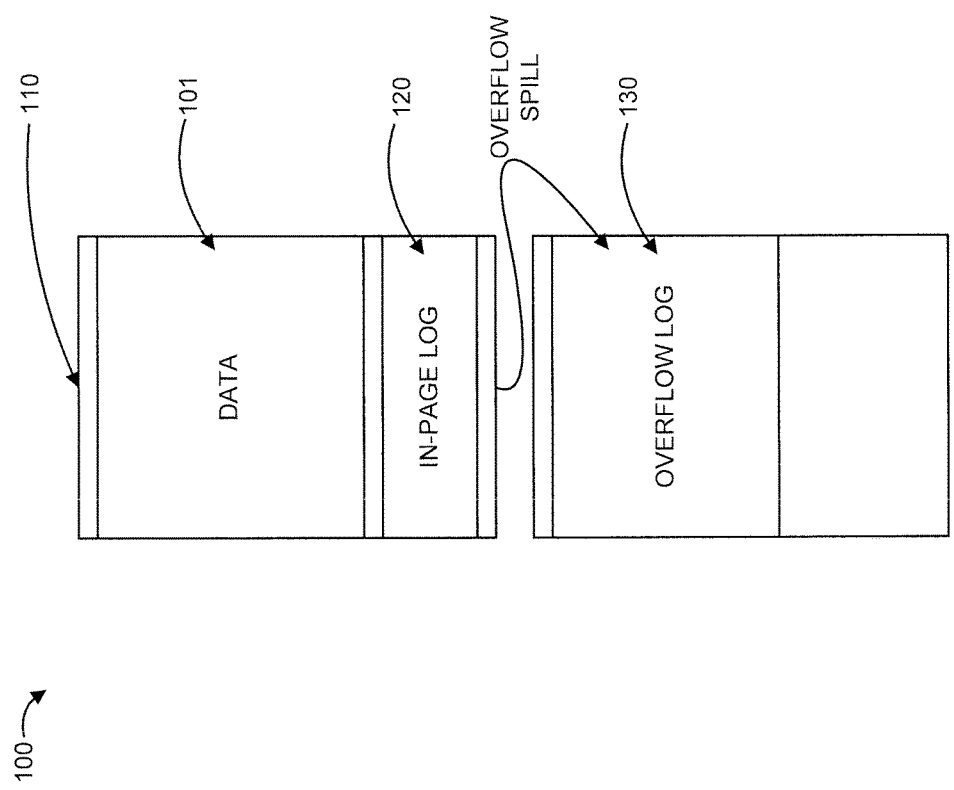
FIG. 1 shows an exemplary page-based transient snapshot 100, in accordance with an embodiment of the present principles.

FIG. 1 shows an exemplary page-based transient snapshot 100, in accordance with an embodiment of the present principles. The snapshot 100 includes a data page 110, an in-page log 120, and an overflow log 130. The data page 110 includes a data portion 101 for storing data. The data can include, for example, but is not limited to, status information indicating a respective status of active (not deleted) or inactive (deleted) of corresponding records. In an embodiment, the in-page log 120 for a given set of records is on the same data page 110 as the given set of records. In an embodiment, the in-page log 120 for a given set of records is at least partially on a different data page as the given set of records. In an embodiment, the snapshot 100 can be read from the base table.

Figure 2:
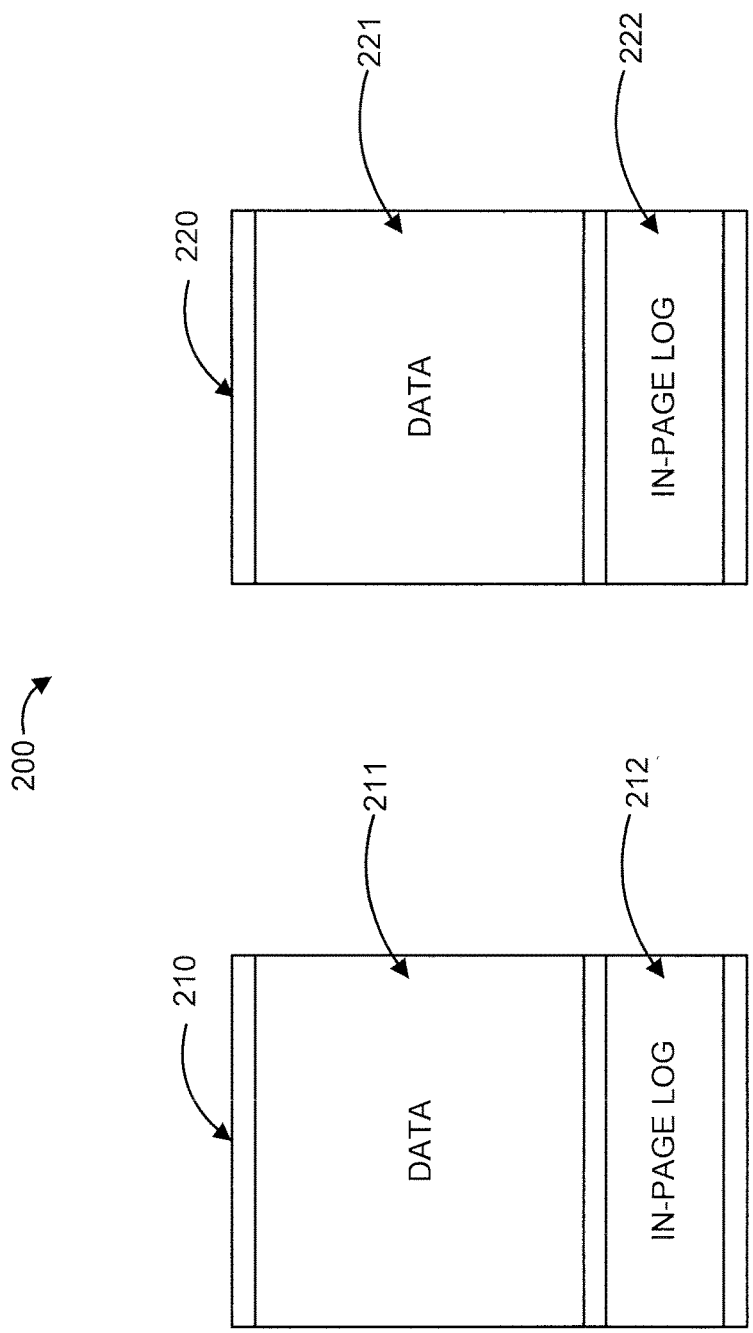
FIG. 2 shows an exemplary page-split-based transient snapshot 200, in accordance with an embodiment of the present principles.

FIG. 2 shows an exemplary page-split-based transient snapshot 200, in accordance with an embodiment of the present principles. The snapshot 200 includes a first data page 210 and a second data page 220. The first data page 210 includes a first page data portion 211 and a first page in-page log 212. The second data page 220 includes a second page data portion 221 and a second page in-page log 222. Hence, responsive to the condition of the log of a particular page (not shown) becoming full, the particular page is split into the first data page 210 and the second data page 220. The first and second data pages 210 and 220 can include the first and second halves of the data from the particular page, or any other amounts.

In an embodiment, space is pre-allocated in each of the in-page logs for all the records on a corresponding data page. Once the log space is used, then an overflow page is created with a similar structure (per FIG. 1) or the page is split into two pages (per FIG. 2).

In another embodiment, space is pre-allocated for X log delete/update entries for every N data entries, to provide direct access to log information for a given set of records. Here, X and N are integers. Once the log space is used, then an overflow page is created with a similar structure (per FIG. 1).

Figure 3:
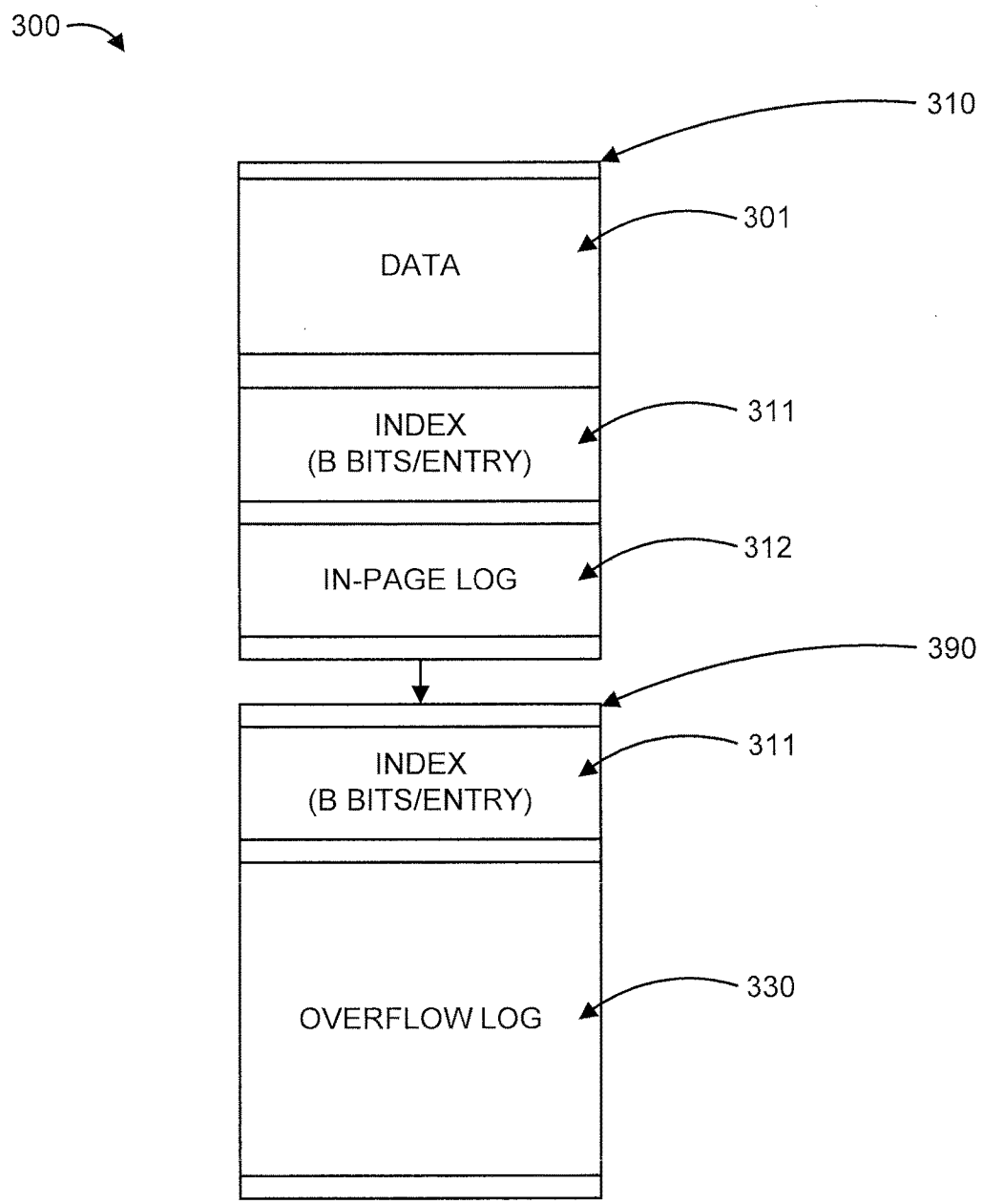
FIG. 3 shows an exemplary index-based transient snapshot 300, in accordance with an embodiment of the present principles.

In yet another embodiment, space is pre-allocated for an index to provide direct access to the in-page log. FIG. 3 shows an exemplary index-based transient snapshot 300, in accordance with an embodiment of the present principles. The snapshot 300 includes a data page 310 and an overflow page 390. The data page 310 includes a data portion 301, an index 311, and an in-page log 312. The overflow page 390 includes an index 311 and an overflow log 330. Pre-allocate B bits for every record entry on the page 311. Here, B is an integer. When a record is updated, we can look up the pre-allocated index entry. If the index 311 is not full, then we write the updated information in the log 312 and store, in the index entry, the location of the log entry for that record. If the index 311 is full, then an overflow page 390 is created (per FIG. 1) with a similar structure.

It is to be appreciated that the present principles are not limited to application to only certain types of data pages and can advantageously be applied to any type of data pages including, but not limited to column-oriented data pages, row-oriented data pages, and so forth. Thus, while one or more embodiments described herein may mention one or more particular types of data pages as being used, other types than those mentioned can also be used in accordance with the teachings of the present principles, while maintaining the spirit of the present principles.

A description will now be given regarding in-page logging, in accordance with an embodiment of the present principles.

A transaction updates/deletes records. The records are kept on, e.g., multiple data pages.

The xid of the transaction responsible for the changes is added to the in-page log 120. If the in-page log 120 is not full, then append (xid, offsets) entry to the tail of the in-page log 120. The updated values of a record can also be added. If the in-page log is full 120 and the in-page log 120 has enough obsolete xid entries to write (xid, offsets), then overwrite the obsolete entries. Alternatively, if no overflow pages are permitted, then the oldest entries are always over-written even if they are not obsolete yet, and a long running query may be restarted. The recent updated values could become obsolete, however, the latest update value will never become obsolete. The only way to drop the latest value is to update the page itself with latest value first then remove it from the log. As another alternative, page splitting may be used, for example, as shown and described with respect to FIG. 2. If the in-page log 120 is full and the in-page log 120 does not have enough obsolete entries, then append the new entry (xid, offsets) to the tail of overflow log 130.

Figure 4:
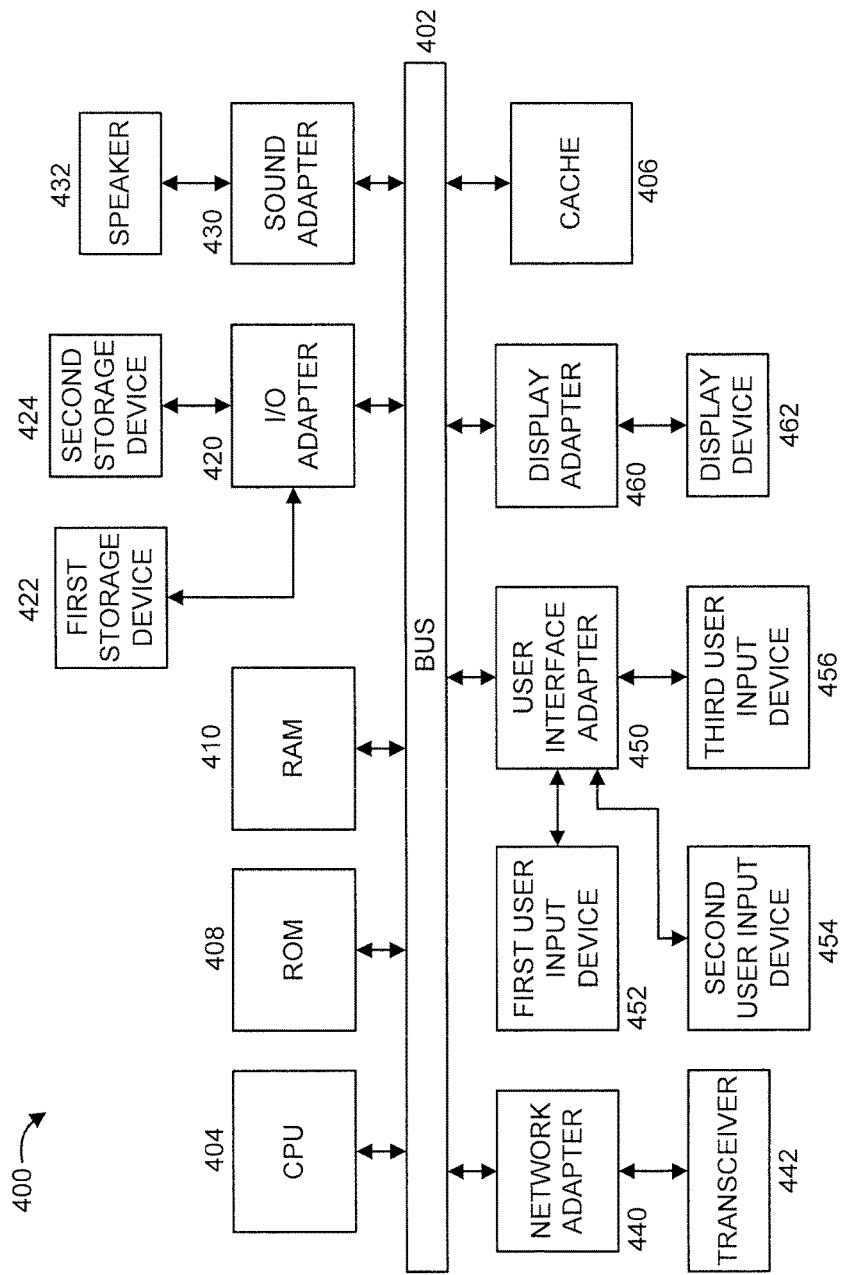
FIG. 4 shows an exemplary processing system 400 to which the present principles may be applied, in accordance with an embodiment of the present principles.

FIG. 4 shows an exemplary processing system 400 to which the present principles may be applied, in accordance with an embodiment of the present principles. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Figure 5:
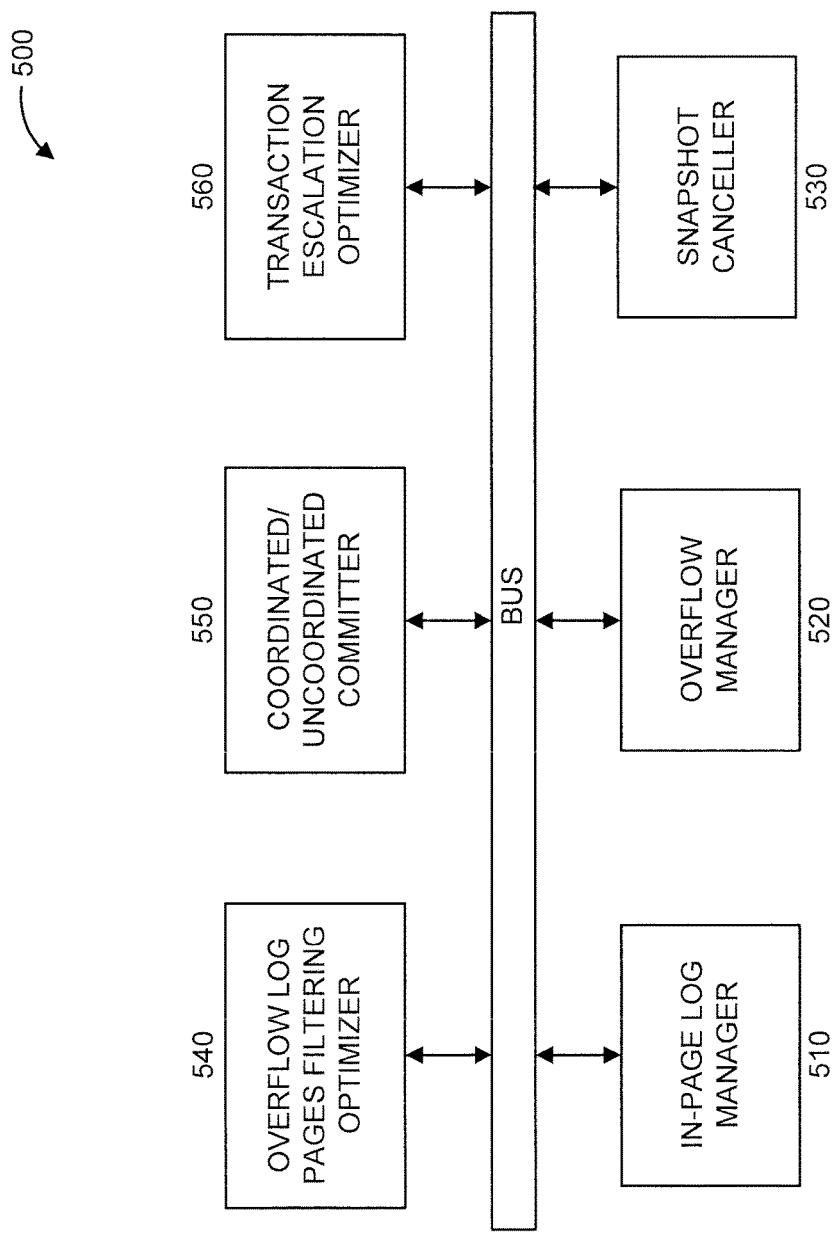
FIG. 5 shows an exemplary system 500 for generating a transient snapshot with a coordinated/uncoordinated commit protocol, in accordance with an embodiment of the present principles.

Moreover, it is to be appreciated that system 500 described below with respect to FIG. 5 is a system for implementing respective embodiments of the present principles. Part or all of processing system 400 may be implemented in one or more of the elements of system 500.

Figure 6:
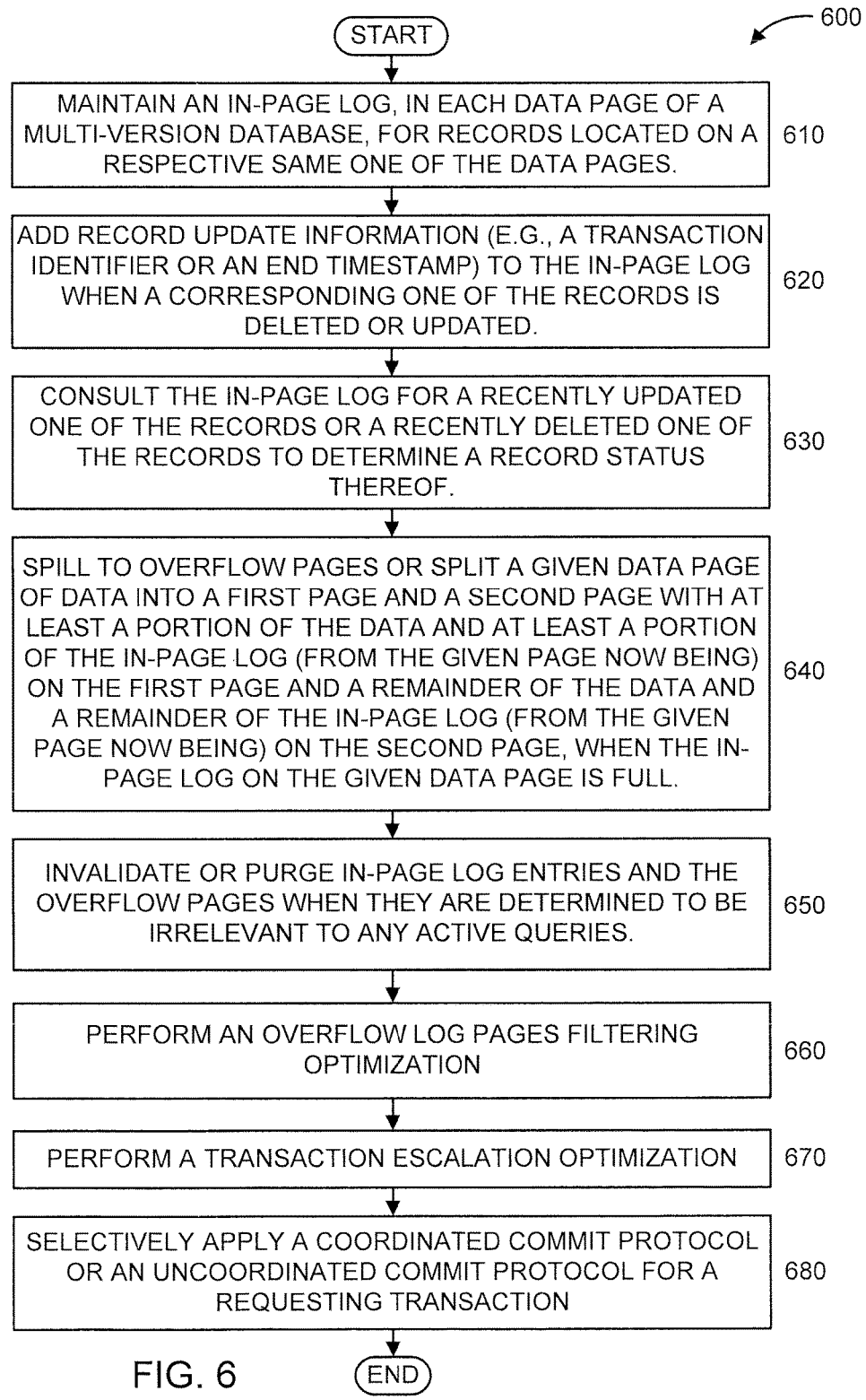
FIG. 6 shows an exemplary method 600 for generating a transient snapshot with a coordinated/uncoordinated commit protocol, in accordance with an embodiment of the present principles.
Figure 7:
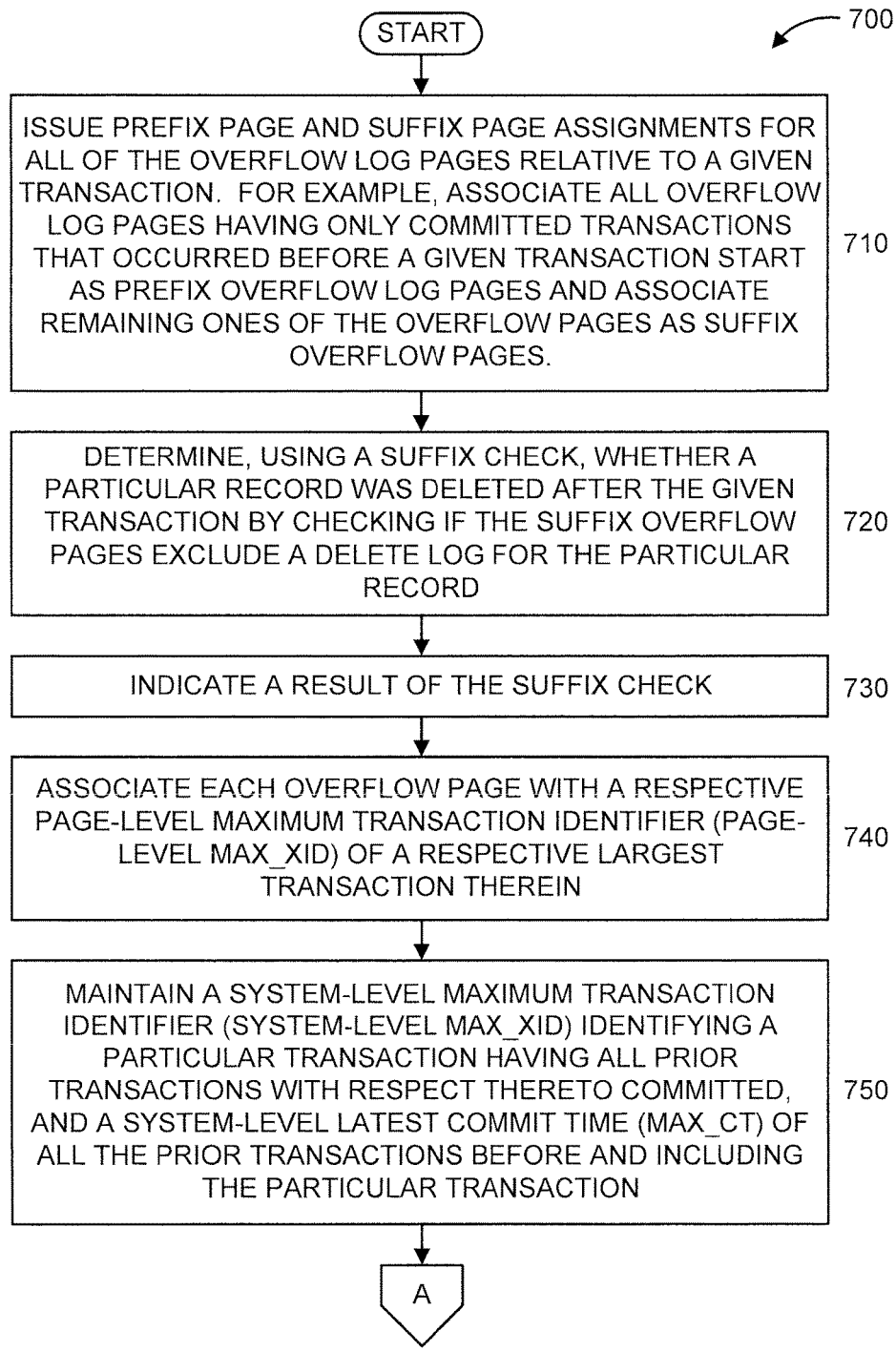
FIGS. 7-8 show an exemplary method 700 for overflow log pages filtering optimization, in accordance with an embodiment of the present principles.
Figure 8:
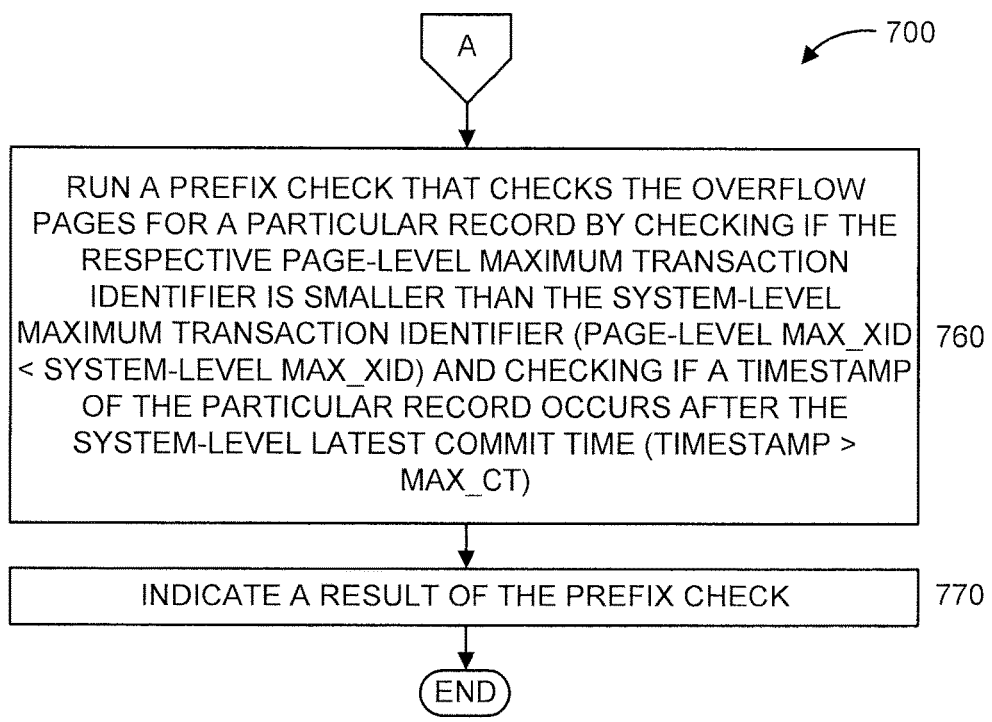
Figure 9:
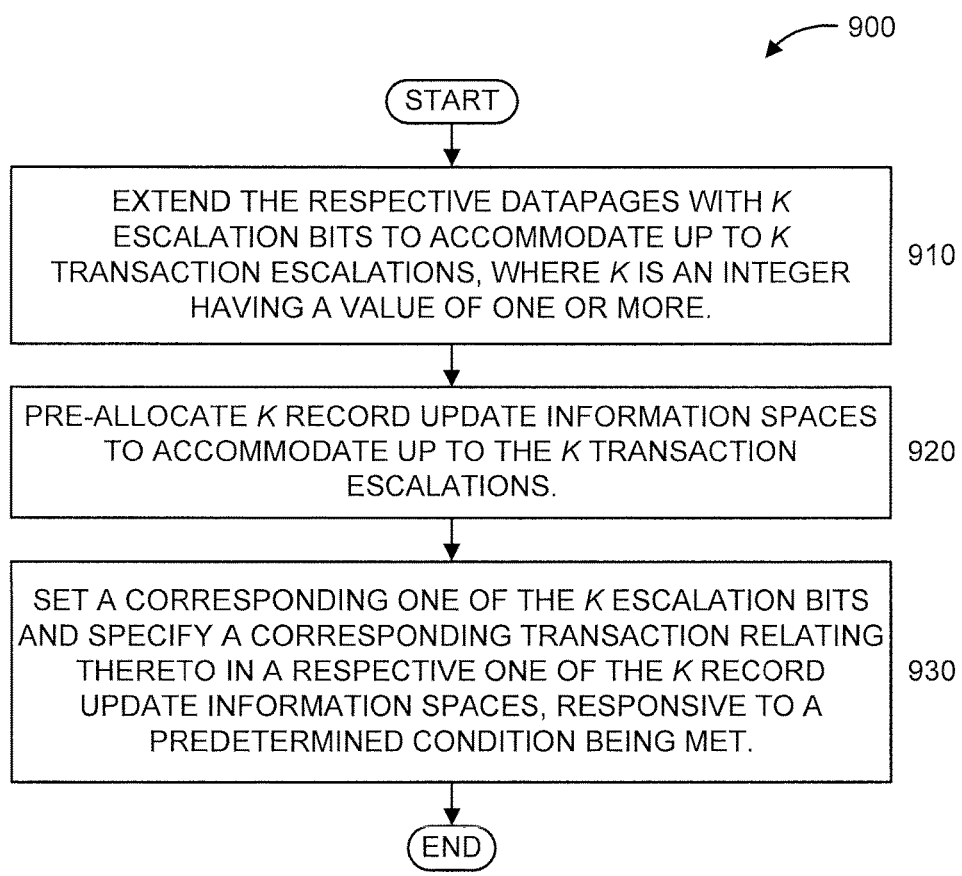
FIG. 9 shows an exemplary method 900 for transaction escalation optimization, in accordance with an embodiment of the present principles.

Further, it is to be appreciated that processing system 400 may perform at least part of the method described herein including, for example, at least part of method 600 of FIG. 6 and/or at least part of method 700 of FIGS. 7-8 and/or at least part of method 900 of FIG. 9. Similarly, part or all of system 500 may be used to perform at least part of method 600 of FIG. 6 and/or at least part of method 700 of FIGS. 7-8 and/or at least part of method 900 of FIG. 9.

FIG. 5 shows an exemplary system 500 for generating a transient snapshot with a coordinated/uncoordinated commit protocol, in accordance with an embodiment of the present principles. The system 500 includes an in-page log manager 510, an overflow manager 520, a snapshot canceller 530, an overflow log pages filtering optimizer 540, a coordinated/uncoordinated committer 550, and a transaction escalation optimizer 560. In an embodiment, the elements of system 500 are interconnected via a bus 501. Of course, other connections and configurations of the elements of system 500 can also be used while maintaining the spirit of the present principles.

The in-page log manager 510 maintains the in-page log 120 for records in each data page 110 of a multi-version database. The in-page log manager 510 adds record invalidation information to the in-page log 120 when a corresponding one of the records is deleted or updated. The in-page log manager 510 consolidates the in-page log 120 for a recently updated one of the records or a recently deleted one of the records to determine a record visibility thereof.

The overflow manager 520 spills to overflow pages 130 when the in-page log 120 is full. The overflow pages 130 can be disk-resident or memory-resident.

The snapshot canceller 530 invalidates or purges in-page log entries and the overflow pages 130 when they are outside a time window of an oldest active query.

The overflow log pages filtering optimizer 540 performs an overflow log pages filtering optimization. The optimization enables rapid determination of record deletion using a prefix test. The overflow log pages filtering optimization is shown and described herein with respect to at least FIGS. 7-8.

The coordinated/uncoordinated committer 550 selectively applies a coordinated commit protocol or an uncoordinated commit protocol for a transaction.

The transaction escalation optimizer 560 performs a transaction escalation optimization. The transaction escalation optimization is shown and described herein with respect to at least FIG. 9.

The data pages can include any of row-oriented data pages and column-oriented data pages. Of course, the present principles can be used with other types of pages, while maintaining the spirit of the present principles.

Also, while FIG. 5 is described with respect to a multi-version database, in another embodiment, a non-multi-version database can be used where, for example, historic information is tracked in the page log (e.g., for non-user related reasons).

In an embodiment, at least the in-page log manager 510 and the overflow manager 520 are processor-based. In an embodiment, they share the same processor. In another embodiment, they have their own respective processors. These and other variations of the elements of system 500 are readily determined by one of ordinary skill in the art given the teachings of the present principles provided herein, while maintaining the spirit of the present principles.

FIG. 6 shows an exemplary method 600 for generating a transient snapshot with a coordinated/uncoordinated commit protocol, in accordance with an embodiment of the present principles.

At step 610, maintain an in-page log 120, in each data page 110 of a multi-version database, for records located on a respective same one of the data pages 110. The data pages 110 can include any of row-oriented data pages and column-oriented data pages and other types of data pages.

At step 620, add record update information (e.g., a transaction identifier or an end timestamp) to the in-page log 120 when a corresponding one of the records is deleted or updated.

At step 630, consult the in-page log 120 for a recently updated one of the records or a recently deleted one of the records to determine a record status (e.g., active or inactive and updated values) thereof. The updated values would correspond to an updated record.

At step 640, spill to overflow pages 130 (per FIG. 1) or split a given data page of data into a first page 210 and a second page 220 with at least a portion of the data 211 and at least a portion of the in-page log 212 (from the given page now being) on the first page 210 and a remainder of the data 221 and a remainder of the in-page log 222 (from the given page now being) on the second page 220 (per FIG. 2), when the in-page log on the given data page is full.

At step 650, invalidate or purge in-page log entries and the overflow pages 130 when they are determined to be irrelevant to any active queries. In an embodiment, the in-page log entries and the overflow pages 130 are invalidated or purged by marking the record invalidation information as pseudo deleted and garbage collected.

At step 660, perform an overflow log pages filtering optimization. The overflow log pages filtering optimization is further shown and described herein with respect to at least FIGS. 7-8.

At step 670, perform a transaction escalation optimization. The transaction escalation optimization is further shown and described herein with respect to at least FIG. 9.

At step 680, selectively apply a coordinated commit protocol or an uncoordinated commit protocol for a requesting transaction. In an embodiment, a coordinated commit protocol advances time in-order when a particular transaction invokes a request commit time call and hides time increases from any subsequent request time calls until the particular transaction commits or aborts. In an embodiment, an uncoordinated commit protocol advances time in-order when a particular transaction invokes a request commit time call and makes time increases visible to any subsequent request time call.

FIGS. 7-8 show an exemplary method 700 for overflow log pages filtering optimization, in accordance with an embodiment of the present principles.

At step 710, issue prefix page and suffix page assignments for all of the overflow log pages relative to a given transaction. In an embodiment, step 710 can include associating all of the overflow log pages having only committed transactions that occurred before a given transaction start as prefix overflow log pages and associating remaining ones of the overflow pages as suffix overflow pages.

At step 720, determine, using a suffix check, whether a particular record was deleted after the given transaction by checking if the suffix overflow pages exclude a delete log for the particular record.

At step 740, indicate a result of the suffix check

At step 750, associate each overflow page with a respective page-level maximum transaction identifier (page-level max_xid) of a respective largest transaction therein.

At step 760, maintain a system-level maximum transaction identifier (system-level max_xid) identifying a particular transaction having all prior transactions with respect thereto committed, and a system-level latest commit time (max_ct) of all the prior transactions before and including the particular transaction.

At step 770, run a prefix check that checks the overflow pages for a particular record by checking if the respective page-level maximum transaction identifier is smaller than the system-level maximum transaction identifier (page-level max_xid<system-level max_xid) and checking if a timestamp of the particular record occurs after the system-level latest commit time (timestamp>max_ct).

At step 760, indicate a result of the prefix check.

FIG. 9 shows an exemplary method 900 for transaction escalation optimization, in accordance with an embodiment of the present principles. In the embodiment of FIG. 9, the data pages specify whether a record is active (not deleted) or inactive (deleted) for respective tuples.

At step 910, extend the respective data pages with k escalation bits to accommodate up to k transaction escalations, where k is an integer having a value of one or more.

At step 920, pre-allocate k record update information spaces to accommodate up to the k transaction escalations.

At step 930, set a corresponding one of the k escalation bits and specifying a corresponding transaction relating thereto in a respective one of the k record update information spaces, responsive to a predetermined condition being met.

A description will now be given of supporting a transient snapshot read for a base table, in accordance with an embodiment of the present principles.

We extend data pages with the identifier of a transaction that changed the records (either deleted or updated the record).

Every data page (or key column page) 110 is allocated a small log space 120 within the page 110, determined based on the workload update frequency.

In the in-page log space 120, the xid of the transaction changing the record or the commit time of the changing transaction is stored. For example, entries are stored either as sequence key offsets/indices (xid, offset1, . . . , offsetn) and/or a range of record (xid, offset1-offsetn).

The log space 120 is not pre-allocated for every record entry on the page because (1) updates are sparse across data pages, and (2) only recent changes that occurred after the oldest active query in the system are kept.

The xid is added by either appending to the end of the log 120 or overwriting a xid log entry that is no longer needed, relying on (region) temporary overflow pages 130 if the log 120 is full.

The xid is marked as pseudo deleted and garbage collected, as overwritten records are no longer relevant to any active queries.

When inserting new records, no xid entry is added in the in-page log space.

Only changes to the page is are included in undo-log. The xid is not included in the undo-log because if a transaction aborts, then it is sufficient to just undo changes to the non-log portion of the page. The in-page log 520 participates only in the redo-log.

A description will now be given regarding supporting a transient snapshot read from the index, in accordance with an embodiment of the present principles.

LID-Indexes are employed instead of row identifier (RID. Using the Indirection technique, the latest version of the record in the table can be accessed, where a (key, LID) pair is stored in leaf pages.

Extend index leaf pages with transient snapshot support results in storing (key, LID, state, timestamp/xid). If the state is active, then the entry refers to the current version, and xid is the inserting transaction or beginning timestamp. If the state is staging, then the entry refers to an older version (that is needed by some query), the xid is for the deleting/updating transaction or an end timestamp, and the LID could potentially be replaced by RID as well. If the state is pseudo deleted, then the entry is marked as deleted and can be garbage collected.

The Indirection mapping is extended by a transient in-page log that keeps track of the recent RID associated to each LID.

Regarding (LID, RID, end timestamps/xid), in an embodiment, the LID therein can be replaced by the page offset.

In an embodiment, the timestamp/xid can be differential of the page timestamp/xid (and could be eliminated for static pages).

In an embodiment, records in a table may have (logical) back pointers to their last version (if any).

In addition, to extending base table pages and index pages, an additional structure for mapping xid to the end timestamp (the transaction's commit timestamp) must be maintained, if xid is stored instead of the end timestamp.

A description will now be given regarding mapping xid to a commit timestamp, in accordance with an embodiment of the present principles.

We maintain an array of transaction commit times, array [xid]=commit time, which is used for recording the commit time of a transaction that inserts/deletes/updates a record.

Since xids are sequential, then this structure can easily be constructed as an array for fast memory access (and making it page-based is trivial).

Only the tail of this array is accessed, the tail corresponds to those transactions that are after the oldest active query. The rest can be garbage collected aggressively A description will now be given regarding transaction time ordering, in accordance with an embodiment of the present principles.

The following time function can be used: a request commit timestamp (RCT); and a request system timestamp (RST).

We first describe a coordinated commit (snapshot reads are non-speculative) as follows. Time advances are in-order when a transaction invokes an RCT call. However, the time increase is not visible to any RST call until the transaction either commits or aborts (RST<=RCT). A transaction's commit/abort order may be out-of-order and not following the commit timestamp. A transaction could also be forced to commit in-order to avoid breaking existing application semantics. RST returns t, where t is the largest time such that for all $t_i<=t$, $t_i$ has been already assigned to a committing transaction and that transaction is either committed or aborted. The timestamp is added after a RCT call (when transaction commit time and commit decision are known), thus, no speculative read or transaction state checking are necessary.

We now described an uncoordinated commit (snapshot reads are speculative) as follows. Time advances are in-order when a transaction invokes an RCT call and the time increase is visible to any subsequent RST call (RST=RCT). A timestamp is added after RST call (when transaction commit time is unknown), thus: the transaction identifier is used as a place holder for the time of flipped bit; transaction state checking is necessary (speculative read is possible); and transaction time must be overwritten once the transaction has received a commit time and the commit decision has been determined.

A description will now be given regarding multi-version record management in a shared architecture, in accordance with an embodiment of the present principles.

Divide a table into a set of partitions (one or more partitions are assigned to a node). Each node writes only to their partitions' tail. Records written to a tail of table become visible only when the tail is flushed to disk. Early/Forced flushing is employed using padding the page, the padding is naturally removed upon subsequent page compression (required in column-store). Every page is flushed only once to disk and pages are never invalidated.

A description will now be given regarding key benefits of in-page logging of transient snapshot support, in accordance with an embodiment of the present principles.

In-page clustered access is provided for retrieving xid information for a scan (thus, avoiding random access and cache misses for determining the transaction responsible for the change).

If a transaction updates many rows (or bulk operations), especially if there are contiguous, then the log can hold sequence/range of offset with a single xid, thus substantially reducing log space and speeding up both read and write transactions.

If the log space is full, then (region) overflow pages can be used as follows. An overflow page can be used when the log is full, where an overflow log page would be identical to a regular data page except that 100% of the page is now dedicated to in-page the log. Overflow pages are simply dropped once they are no longer relevant for any queries, thus, no re-organization and transfer of data from overflow to the main page is required.

A description will now be given regarding an overflow log pages filtering optimization, in accordance with an embodiment of the present principles.

Each overflow log page is associated to a respective maximum xid of the largest transaction in the page. The database maintains the following: the maximum xid (max_xid) for which all the transactions prior to it have been committed; and the latest commit time (max_ct) of all transactions before and including max_xid.

For any given reader transaction, all overflow log pages that include only committed transactions that occurred before the reader transaction started are considered as prefix overflow log pages, and the rest are suffix overflow log pages. Prefix testing includes checking if the page max_xid is smaller than the system max_xid and the transaction read timestamp is after max_ct.

The reader needs to examine only suffix overflow pages to determine if a desired record was deleted after the reader timestamp. If no delete log entry is found in the suffix pages, then the delete log entry must be in the prefix pages implying that the record must have been deleted before the reader transaction started. Thus, the record is simply discarded.

Examining the index/bitmap of every log page provides a second level of filtering.

A description will now be given regarding a transaction escalation optimization, in accordance with an embodiment of the present principles.

We extend each data page with k escalation bits (e.g., k=1).

We pre-allocate up to k xid spaces to accommodate up to k transaction escalation. Assuming k=1, if a transaction attempts to change more than 5% of page randomly, and the corresponding escalation bit for these newly updated record are set, then the xid of the updating transaction is recorded in the pre-allocated xid space. Instead of allocating k escalation bits, we allocated 1 bit, and use 4 bits/entry index (proposed previously) to accommodate up to 16 escalating transactions.

Transaction escalation is a matter of encoding and does not change the semantics of the update nor add any new restrictions.

A description will now be given regarding some exemplary modifications to some of the embodiments described herein.

For example, in some embodiments, the tail of a data structure (e.g., a queue, a table, a log, an array, etc.) is used to enter and/or remove data/information. However, in other embodiments, the converse portion of the data structure can be used, while maintaining the spirit of the present principles. Additionally, while identifiers such as LID, RID, xid, and so forth are mentioned herein, in other embodiments various other ones of the identifiers mentioned herein and/or other identifiers can also be used in accordance with the teachings of the present principles, while maintaining the spirit of the present principles. It is to be appreciated that these and various other modifications can be made to the teachings of the present principles provided herein, while maintaining the spirit of the present principles.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
maintaining an in-page log for records in each of a plurality of data pages of a multi-version database;
adding record update information to the in-page log when a corresponding one of the records is deleted or updated;
consulting the in-page log for a recently updated one of the records or a recently deleted one of the records to determine a record status thereof;
spilling, by a processor-based overflow manager, to overflow pages when the in-page log is full;
invalidating and purging in-page log entries and overflow pages determined to be irrelevant to any active queries by marking record invalidation information as pseudo deleted and garbage collected; and
generating a transient snapshot for at least one of the plurality of data pages by selectively applying a coordinated commit protocol or an uncoordinated commit protocol for a requesting transaction,
wherein the data pages comprise any of row-oriented data pages and column-oriented data pages.

2. The method of claim 1, wherein said maintaining step comprises maintaining the in-page log, in each of the plurality of data pages, for records located on a respective same one of the plurality of data pages.

3. The method of claim 1, wherein said maintaining step comprises maintaining the in-page log in a given one of the plurality of data pages for one or more records on a different one of the plurality of data pages when the different one of the plurality of data pages is full and the given one of the plurality of data pages has corresponding space therein.

4. The method of claim 1, wherein the record update information comprises at least one of a transaction identifier, an end timestamp.

5. The method of claim 4, wherein the record update information further comprises an updated record value.

6. The method of claim 4, wherein the record update information further comprises a changed record identifier identifying a respective changed one of the records.

7. The method of claim 6, wherein the changed record identifier comprises at least a row identifier, a logical identifier, a record offset, and an updated record value.

8. The method of claim 4, wherein each of the plurality of data pages comprises specifies a status of active or inactive for respective records, and the method further comprises:
extending at least some of the plurality of data pages with k escalation bits to accommodate up to k transaction escalations, where k is an integer having a value of one or more;
pre-allocating k record invalidation information spaces to accommodate up to the k transaction escalations; and
setting a corresponding one of the k escalation bits and specifying a corresponding transaction relating thereto in a respective one of the k record invalidation information spaces, responsive to a predetermined condition being met.

9. The method of claim 1, wherein the plurality of data pages comprises data pages specifying whether respective records are active or inactive, and the record update information is stored as at least one of a sequence of records offsets and a range of records.

10. The method of claim 1, further comprising:
associating each of the overflow pages with a respective page-level maximum transaction identifier identifying a respective largest transaction therein;
maintaining a system-level max transaction identifier identifying a particular transaction having all prior transactions with respect thereto committed, and a system-level latest commit time of all the prior transactions before and including the particular transaction; and
checking the overflow pages for a particular one of the records by checking if the respective page-level maximum transaction identifier is smaller than the system-level max transaction identifier and checking if a timestamp of the particular one of the records occurs after the system-level latest commit time.

11. The method of claim 1, further comprising associating all of the overflow pages having only committed transactions that occurred before a given transaction start as prefix overflow log pages and associating remaining ones of the overflow pages as suffix overflow pages, and indicating that a particular one of the records was deleted after the given transaction start when the suffix overflow pages exclude a delete log for the particular one of the records.

12. The method of claim 1, further comprising applying a coordinated transaction commit protocol that advances time in-order when a particular transaction invokes a request commit time call and hides time increases from any subsequent request time calls until the particular transaction commits or aborts.

13. The method of claim 1, further comprising applying an uncoordinated transaction commit protocol that advances time in-order when a particular transaction invokes a request commit time call and makes time increases visible to any subsequent request time call.

14. A method, comprising:
maintaining an in-page log for records in each of a plurality of data pages of a database;
adding record update information to the in-page log when a corresponding one of the records is deleted or updated;
consulting the in-page log for a recently updated one of the records or a recently deleted one of the records to determine a record status thereof; and
splitting, by a processor-based overflow manager, a given data page of data into a first page and a second page with at least a portion of the data and at least a portion of the in-page log on the first page and a remainder of the data and a remainder of the in-page log on the second page when the in-page log on the given data page is full; and
invalidating and purging in-page log entries and overflow pages determined to be irrelevant to any active queries by marking record invalidation information as pseudo deleted and garbage collected; and
generating a transient snapshot for at least one of the plurality of data pages by selectively applying a coordinated commit protocol or an uncoordinated commit protocol for a requesting transaction,
wherein the data pages comprise any of row-oriented data pages and column-oriented data pages.

* * * * *